United States Patent [19]

Hoy et al.

[11] Patent Number: 4,481,402
[45] Date of Patent: Nov. 6, 1984

[54] MULTI-POSITION PLATE WELDING USING MODIFIED DOUBLE-J JOINT

[75] Inventors: Malcolm G. Hoy, New Kensington; Michael M. Ball, Pittsburgh, both of Pa.

[73] Assignee: Aluminum Company of America, Pittsburgh, Pa.

[21] Appl. No.: 424,145

[22] Filed: Sep. 27, 1982

[51] Int. Cl.$^3$ .............................................. B23K 33/00
[52] U.S. Cl. ................................. 219/137 R; 219/74; 219/126
[58] Field of Search .................... 219/137 R, 74, 126

[56] References Cited

U.S. PATENT DOCUMENTS

| | | | |
|---|---|---|---|
| 2,916,600 | 12/1959 | Tichler | 219/74 |
| 3,328,556 | 6/1967 | Nelson et al. | 219/137 R |
| 4,038,514 | 7/1977 | Ashton | 219/126 |
| 4,292,496 | 9/1981 | Hoy et al. | 219/126 |

OTHER PUBLICATIONS

*Welding Handbook,* 6th Edition, American Welding Society, pp. 8.3 through 8.8.

*Primary Examiner*—C. L. Albritton
*Assistant Examiner*—Alfred S. Keve
*Attorney, Agent, or Firm*—Brian D. Smith

[57] ABSTRACT

A multi-position method is provided for gas metal arc welding thick aluminum alloy plates in a single welding pass on each surface of the plates. A first plate edge is provided with a tongue portion having (1) a land surface abutting a portion of a second plate edge, and (2) two arcuate J-shaped side surfaces, each adjoining the land surface at opposite ends thereof and each adjoining its respective side surface of the first plate at an angle approximating 90°. The J-shaped side surfaces and second plate edge surface cooperate to define a modified double-J welding groove. The plates are welded together in a single pass on each side thereof by first depositing a weld bead in the modified J groove on one side of the plates and then, after this bead has sufficiently solidified, a second weld bead is deposited in a single pass in the modified double-J groove on the other side of the plates. Welding is carried out in the presence of a shield gas, preferably argon, with a direct current ranging from 290 to 420 amperes.

25 Claims, 5 Drawing Figures

MULTI-POSITION PLATE WELDING USING MODIFIED DOUBLE-J JOINT

BACKGROUND OF THE INVENTION

The invention relates to gas metal arc welding comparatively thick metal plates. More particularly, the invention relates to a multi-position method for welding thick abutting aluminum plates wherein welding can be effected on each surface of the plates in one pass in either the flat, vertical, horizontal or overhead welding position.

As used herein, "single pass" refers to welding one side of abutting plates in one pass. Because single pass welding offers many advantages over conventional multi-pass welding, those involved in the welding field have spent considerable time and effort developing single pass techniques and methods, particularly with respect to welding thick aluminum plates. Single pass welding, in addition to eliminating interpass weld defects (as there is only one pass), provides economic advantages such as lower gas consumption in shielding the weld and less welding time per weld (i.e., multi-pass techniques take more time and therefore are more costly).

While much progress has been made, there still remains a need for simpler and more economical single pass processes that can be employed in a variety of welding positions. Multi-position methods reduce costs since a single joint preparation can be used on most plates to be joined. For example, special joint preparation expenses, such as joint designs, typically required by methods only amenable to a few welding positions would be eliminated.

As used herein, "vertical welding" refers to welding vertically disposed plates which form a vertically extending weld line. "Horizontal welding" refers to welding vertically disposed plates forming a horizontally extending weld line. "Flat welding" refers to welding substantially horizontally disposed plates wherein the torch is positioned above the plates. "Overhead welding" refers to welding substantially horizontally disposed plates wherein the torch is positioned below the plates.

U.S. Pat. No. 4,038,514 to Ashton recognizes and discusses the advantages of single pass welding thick aluminum plates and discloses a method providing for such. However, Ashton's method is only amenable to welding vertically extending plates forming substantially vertical weld lines. The Ashton method also requires that a backhand torch angle be used.

In a previous patent issued to Walter Reichelt and Malcolm Hoy; namely, U.S. Pat. No. 4,292,496, there is disclosed a single pass method for welding plates in the horizontal and vertical positions. This method, however, is somewhat complicated in that the method requires that a welding groove be cut on one side surface of the abutting plates after the other side has already been welded.

Also relating to one pass butt welding is U.S. Pat. No. 2,916,600 to Tichler which discloses a single pass method for welding in the vertical position.

Another important aspect of welding thick aluminum plates is ease of joint preparation. A joint design that is difficult to prepare takes more time and is therefore more costly. Previously mentioned U.S. Pat. No. 4,038,514 to Ashton discloses the use of a double bevel joint geometry wherein the abutting edge surfaces of each plate are beveled to form two V-shaped grooves, one on each plate surface, with a land surface therebetween. Other joint geometries commonly employed for butt joint welding are described on pages 8.3 through 8.8 of the *Welding Handbook,* 6th Edition, American Welding Society.

While many of the problems associated with welding thick aluminum plates have been resolved, there still remains a need for a gas metal arc welding method that is easily operated (for example, by using a forehand as opposed to a backhand lead angle), requires minimal joint preparation, is capable of depositing a weld bead on the surface of a relatively thick aluminum or aluminum alloy plate in a single weld pass, and is amenable to welding in a variety of positions.

SUMMARY OF THE INVENTION

In accordance with the present invention, a method is provided for gas metal arc welding comparatively thick aluminum or aluminum alloy plates. The method comprises providing a first and second aluminum plate with abutting edges. The first plate's abutting edge is preferably substantially planar and normal with respect to its side surfaces. The second plate's abutting edge includes a tongue portion having (1) a land surface which abuts a portion of the edge of the first plate, and (2) two arcuate J-shaped side surfaces each of which adjoins the land surface at opposite ends thereof and each of which adjoins its respective side surface of the second plate at an angle approximating 90°. The surface of the first plate and the J-shaped side surfaces of the tongue of the second plate cooperate to define a modified double-J welding groove (said modification to be explained hereinafter). This results in the provision of a first weld groove on one side of the plates and a second weld groove on the other side of the plates.

The plates are then welded together by depositing a first weld bead in the first weld groove to completely fill the groove in a single pass. After the first weld bead has sufficiently solidified, the second weld bead is deposited in a single pass in the second weld groove on the opposite side of the plates to completely fill the second groove and penetrate that portion of the weld line not penetrated by the first weld bead, thereby completing the welding process. The above welding steps are carried out by impressing a direct current of 290 to 420 amperes between an electrode of a welding torch and the aluminum plates, the torch maintaining a forehand or positive lead angle relative to the plate surface.

The welded joint of the present invention includes a joining line formed between the abutting edges of the first and second welded plates. In addition, a first weld bead deposited in a single welding pass completely filling the first weld groove extends along the joining line on one surface of the joined aluminum plates. A second weld bead also deposited in a single welding pass completely filling the second weld groove extends along said joining line on the opposite surface of the joined plates. The weld beads are deposited in the grooves by a welding torch maintained at a forehand or positive lead angle relative to the plate surface. The first and second weld beads form a modified double-J shaped welded joint which, prior to welding, included a modified double-J groove having the first groove on one side of the plates and the second groove on the opposite side of the plates, said grooves being defined by the abutting edge of the first plate and a tongue portion of the second plate having a land surface abutting the edge of the first plate and two J-shaped side surfaces, each adjoining the land surface at opposite ends thereof and each adjoining its respective side surface of the second plate at an angle approximating 90°.

Those skilled in the relevant art will appreciate the ease with which the joint of the present invention can be prepared. It will be recognized that only one plate per joint will require preparation. The first plate edge will not generally require preparation since plates as manufactured are typically provided with planar edges that are substantially normal to their respective side surfaces. Only the second plate will require preparation and that merely involves the provision of the tongue on the second plate edge. Those skilled in the art will recognize that the tongue can be easily prepared by cutting the plate edge with basic, well-known cutting techniques.

It has been found that welds produced by the present process have minimal porosity, low defect rates and good penetration with minimal shrinkage. Furthermore, those skilled in the art will appreciate the ease with which the method of the present invention can be applied. For example, backhand angles are not required. Moreover, welding can be done in a variety of positions—vertical, horizontal, flat and overhead—and a weld bead can be deposited in a single pass per plate surface. The overall effect of these advantages is the production of a sound weld in substantially less time than that required by conventional techniques, thereby resulting in a reduction of material and labor costs. It should also be noted that the present invention does not require the use of any specialized equipment. Conventional gas metal arc welding equipment capable of handling high currents is suitable for use in the present method.

Other details, uses and advantages of this invention will be readily apparent from the exemplary embodiments thereof presented in the following specification, claims and drawings.

DETAILED DESCRIPTION OF THE PREFERRED EMBODIMENTS OF THE INVENTION

Figure 1:
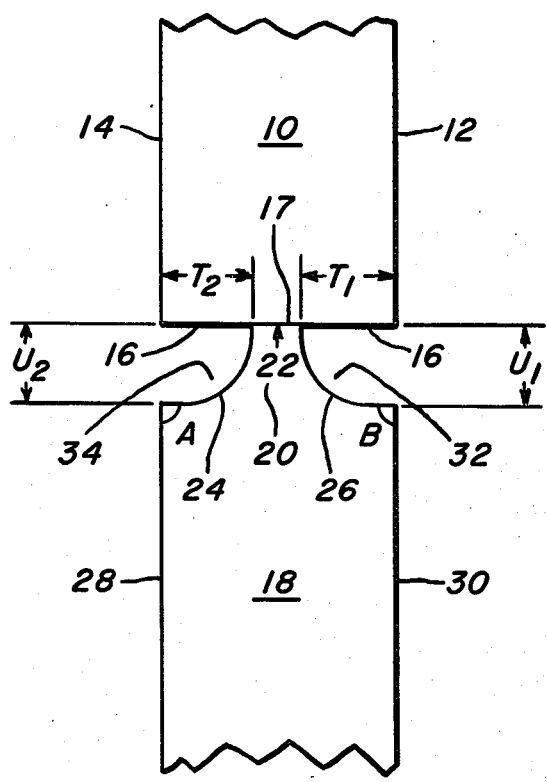
FIG. 1 is an end elevation view illustrating plate edge preparation of the present invention.
Figure 2:
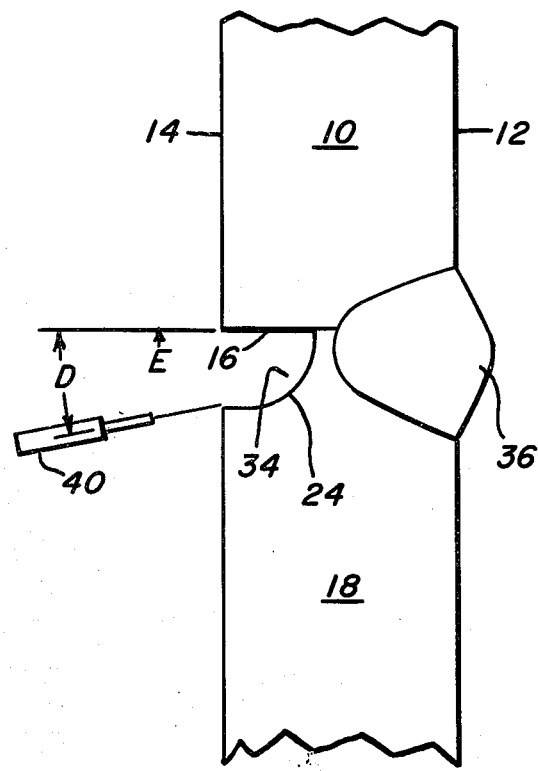
FIG. 2 is an end elevation view showing deposition of a weld bead on one side of the plate.
Figure 3:
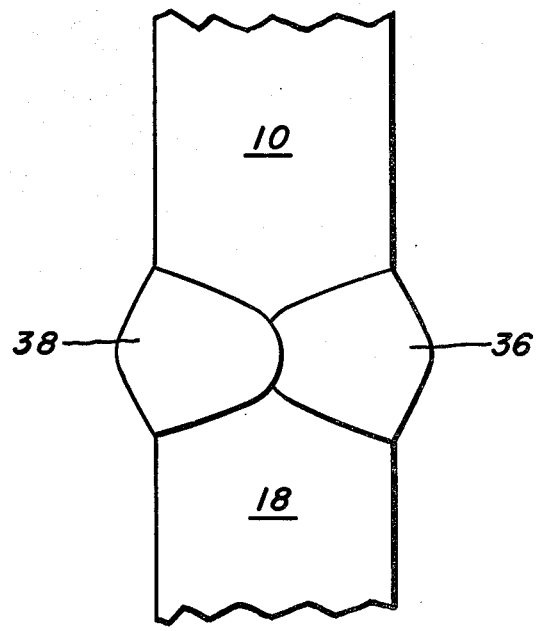
FIG. 3 is an end elevation view showing the plate edges welded in accordance with the present invention.

FIGS. 1 through 3 illustrate a preferred embodiment of plates 10 and 18 welded in accordance with the method of the present invention. Plates 10 and 18, only partially shown in the figures, are provided with an edge 16 and a land surface 22, respectively, abutting to form a weld line 17. Edge 16 and J-shaped side surfaces 24 and 26 cooperate to define, respectively, grooves 34 and 32 on opposite surfaces of the plates. Groove 32 is on the side of the plates including a surface 30 of plate 18 and a surface 12 of plate 10. Groove 34 is on the side of the plates including a surface 28 of plate 18 and a surface 14 of plate 10.

In accordance with the method of the present invention, a weld bead 36 is deposited in a single weld pass to completely fill weld groove 32. After weld bead 36 has had sufficient time to solidify, a second weld bead 38 is deposited in weld groove 34, thereby completing the welding method of the present invention.

FIG. 1 illustrates first plate 10 having opposing and substantially parallel surfaces 12 and 14 and planar edge portion 16 which is substantially normal to plate surfaces 12 and 14. Second plate 18 includes a root or tongue portion 20 provided with a planar land surface 22 abutting a portion of edge 16 of plate 10. Land surface 22 at opposite ends thereof adjoins arcuate J-shaped side surfaces 24 and 26 of tongue 20 at right angles, respectively. J-shaped side surface 24 adjoins side surface 28 of plate 18, preferably at an angle of about 90° ±5°. The outside corner having the 90° angle is identified in FIG. 1 as outside corner A. Similar to J-shaped side surface 24 of tongue 20, arcuate J-shaped side surface 26 of tongue 20 adjoins its respective side surface of plate 18, identified as side surface 30, at an angle also approximating 90° ±5°. This surface adjoining corner is identified in FIG. 1 as outside corner B.

In accordance with the present invention, planar edge 16 cooperates with arcuate J-shaped side surfaces 24 and 26 to define a modified double-J weld groove which is modified in that outside corners A and B are provided with angles approximating 90° ±5°. In contrast, conventional double-J grooves, such as that illustrated on page 8.3 of the previously mentioned *Welding Handbook*, are provided with outside corners having angles equal to or greater than 115°.

As depicted in FIG. 1, the modified double-J groove of the present invention defines welding grooves 32 and 34 which open, respectively, onto opposite sides of the abutting plates.

As can be seen in FIG. 1, grooves 32 and 34 can be provided, and are preferably provided, by only preparing the edge of plate 18. No preparation to edge 16 of plate 10 is required as plates typically are manufactured with planar or square edges. As a result, the cost of edge preparation is minimal. In addition, those skilled in the art will appreciate the ease with which the grooves of the present invention can be provided. Simple cutter heads, either manually or automatically driven, can easily cut the grooves, thereby further minimizing the cost of joint preparation.

The previously mentioned 90° ±5° angle of outside corners A and B is an important feature of the present invention. In addition to serving as an impingement guide for the arc created by the welder's torch, it is believed the substantially 90° angle allows the forces of gravity acting on the molten bead to be counteracted, thereby preventing the bead from running out of the weld groove during welding. The right angled corners create a narrower groove than, for example, more beveled grooves such as those illustrated in previously mentioned U.S. Pat. No. 4,038,514 to Ashton. With narrower grooves it is believed that the molten weld bead's natural surface tension forces and the support provided by the oxide skin on the bead's exposed surface together create a force that is great enough to offset the force of gravity, regardless of welding position, i.e., vertical, overhead, etc.

In addition to right angled outside corners, it has been found that maintaining a groove depth to groove width opening ratio (in FIG. 1, $T_1$ to $U_1$) of approximately 1.33 to 1 will provide preferred results. It has also been found that maintaining a ratio approximating 2 to 1 between the tongue height (also $U_1$) and the radius of curvature of side surfaces 18 and 20 will produce exceedingly good results.

While edge 16 of plate 10 is depicted in FIG. 1 as being substantially planar and normal to plate 10 side surfaces 12 and 14, deviations therefrom can be tolerated by the present invention. For example, that portion of edge 16 which abuts land surface 22 can be provided with a convex projection or rib (not shown) which would mate with a concave land surface 22. Such a rib may be useful in centering the plates to be welded. In such a case adjoining land surface 22 would not adjoin J-shaped surfaces 24 and 26 at a right angle as is depicted in FIG. 1. While the above embodiment would detract from ease of joint preparation, such deviations may occur without departing from the spirit of the present invention.

In FIG. 2 plates 10 and 18 are shown welded together in one pass by weld bead 36 to completely fill weld groove 32 of FIG. 1. It can also be seen that weld bead 36 has substantially penetrated tongue 20 in addition to edge 16 of plate 10 and corner B of plate 18. Weld bead 36 should preferably penetrate tongue 20 to a depth approximating between 60 and 70% of the tongue width. Greater depths are tolerable but burnthrough, i.e. 100% penetration of tongue 20, should not be permitted. If the tongue is completely penetrated, weld groove 34 will have to be backgouged to remove oxides for the purpose of preparing weld groove 34 for welding. If, however, the method of the present invention is followed, burnthrough will not occur; backgouging, therefore, will be unnecessary.

FIG. 3 illustrates the joint of FIGS. 1 and 2 completely welded in accordance with the method of the present invention. Second weld bead 38 deposited in weld groove 34 in one pass has completely filled weld groove 34. As can be seen upon comparing FIGS. 2 and 3, the surfaces of groove 34, i.e., edge 16 and tongue side surface 24, have been penetrated by the deposition of second weld bead 38. In addition, it can be seen that that portion of weld line 17 not penetrated by first weld bead 36 has now been penetrated by second weld bead 38. In accordance with the present invention, weld bead 38 penetrates or extends at least into weld bead 36, overlapping therewith, to completely penetrate that portion of weld line 17 not penetrated by first weld bead 36, thereby providing a sound weld having good mechanical properties, low defect rates and minimal porosity.

In the method of the present invention, plates 10 and 18 with abutting edges may be positioned in any direction. In addition, the plates can be welded in either the horizontal, vertical, overhead or flat position. That is, weld line 17 formed by the abutting plate edges may extend either horizontally or vertically, or at any angle therebetween.

Before the edges of plates 10 and 18 are welded, plate 18 preferably undergoes edge preparation to form grooves 32 and 34. As previously mentioned, grooves 32 and 34 may be provided quite easily by using simple cutter heads, either manually or automatically driven, to cut the edge of plate 18 thereby providing tongue 20 having J-shaped side surfaces 24 and 26. After grooves 32 and 34 have been provided, the surfaces thereof are preferably wiped or treated prior to welding with a conventional solvent, usually a petroleum based solvent.

Conventional gas metal arc welding equipment can be used for carrying out the method of the present invention. The equipment must be capable, however, of handling relatively high welding currents. Such currents may range from 290 to 420 amperes, and preferably range from 325 to 350 amperes. The power source for the welding equipment should provide direct current of reverse polarity and may also be conventional. Power sources that provide drooping voltage/amperage characteristics or constant potential or pulsed arc can also be used to carry out the method of the present invention.

Figure 4:
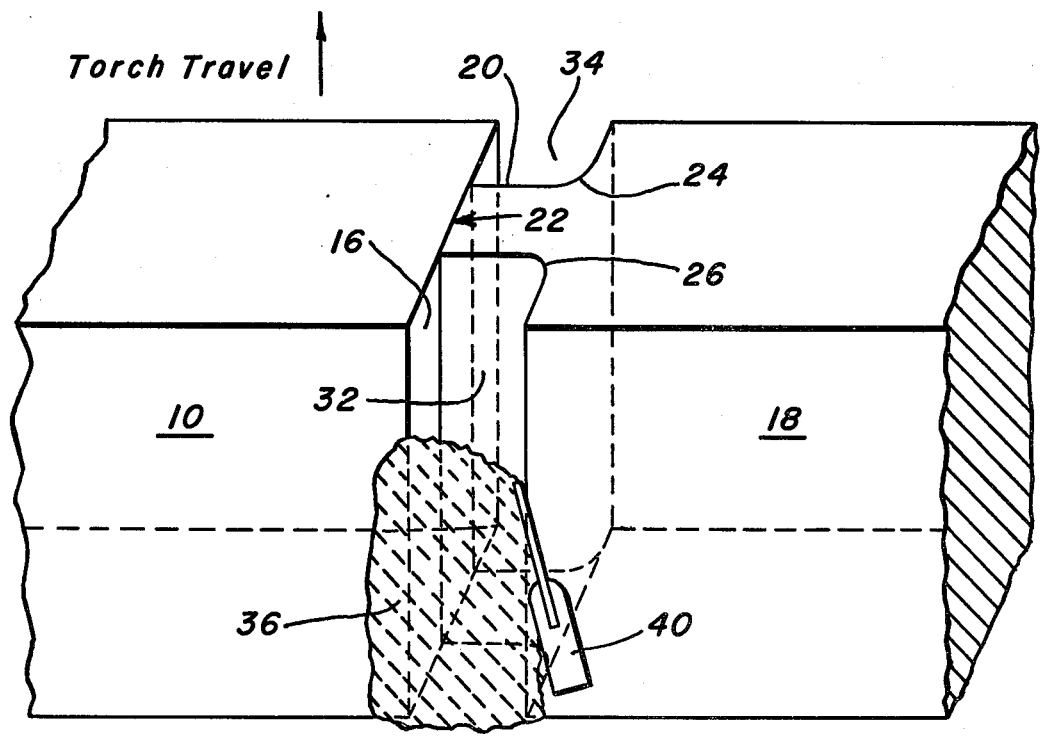
FIG. 4 is a three-dimensional view of the welded plates illustrating the torch position with respect to the weld line.

In carrying out the method of the invention, a torch 40 and electrode passing therethrough are positioned in a particular fashion as shown in FIG. 4. Torch 40 is oriented at a positive lead angle to the joining line. A positive lead angle C positions the torch tip ahead of the torch and the weld bead. By ahead, it is meant in the direction of torch travel along the joining line as weld bead 36 is deposited in the weld groove behind the torch. The lead angle is measured between a plane extending through the torch and a plane extending transverse to the weld line and normal to the plate surface, for example, surface 28 of plate 18. Angle C may range from 5° to 15°, but preferably ranges from 9° to 11°.

Another angle commonly used in the trade to determine torch position is torch angle. Torch angle D of the present invention is, as can be seen in FIG. 2, measured between a plane extending through the torch and a plane identified as plane E which runs parallel to the weld line and normal to the plate surface, for example, surface 28 of plate 18. Angle D may range from 5° to 15°, preferably 9° to 11°.

Figure 5:
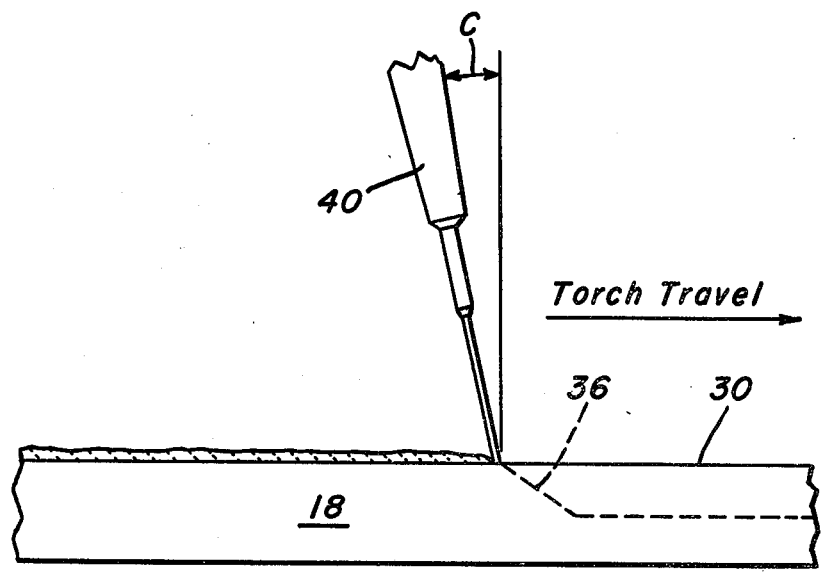
FIG. 5 is a side elevation view showing the relative position of the welding torch with respect to the plate surface.

FIG. 5 further illustrates torch 40 positioned with respect to the weld line. The view of FIG. 5 shows torch 40 depositing the weld bead in the weld groove while traveling along the weld line in accordance with angles C and D. In addition to facilitating cleaning or removing base metal oxide from the surface of the grooves, the orientation of the torch in accordance with the present invention permits greater plate penetration, particularly in the tongue region of plate 18 and in that portion of edge 16 of plate 10 which abuts land surface 22 of plate 18.

A conventional electrode of 1/16 inch (1.6 mm) in diameter can be used in the method of the present invention; however, to facilitate higher deposition rates, a larger than conventional electrode, such as an electrode having a 3/32 inch diameter, is preferred. Thicker electrodes facilitate welding in one pass and also minimize oxide formation because thick electrodes, as opposed to thin electrodes, permit the deposition of more unexposed metal, i.e., metal which has not been exposed to the atmosphere.

The method of the present invention preferably uses argon as the primary shielding gas. Argon enhances plate penetration and provides for better arc cleaning and starting. In the alternative, mixtures of inert gases, such as argon and helium, may be used. For example, it has been found that a mixture of argon and helium performs quite satisfactorily when welding in either the horizontal or flat position. However, argon is the preferred gas particularly when welding in either the vertical or overhead position. Preferably, low flow rates of gas are used ranging from 50 to 100 cubic feet per hour, with 75 cubic feet per hour being preferred.

In accordance with the present invention, the weld bead is deposited in the weld groove with the torch traveling at a speed permitting full groove bead deposition in a single pass. The rate of torch travel may range from 5 to 24 inches per minute. In the horizontal position single pass, full groove bead deposition is possible with torch travel rates ranging from 8 to 24 inches per minute; in the vertical position, 5 to 8 inches per minute; in the flat position, 6 to 12 inches per minute; and in the overhead position, 8 to 24 inches per minute.

After the weld bead on the first side of the plates to be welded has sufficiently solidified, a second weld bead is deposited in a single pass in the second weld groove to completely fill the second groove. In accordance with the present invention, the weld bead deposited in the second groove penetrates that portion of the weld line not penetrated by the first weld bead to provide a welded joint having good mechanical properties, low defect rates, and minimal porosity. Those skilled in the art will appreciate that the second groove requires no welding preparation, such as backgouging, sawing, cutting, etc., after the first weld bead has been deposited. Those skilled in the art will also recognize that both sides of the plates may be welded almost simultaneously. This may be accomplished by positioning the torch on one side of the plates slightly ahead of the torch on the other side of the plates to permit the weld bead deposited by the leading torch a certain amount of time to solidify so that burnthrough will not occur during deposition of the second weld bead on the opposite side of the plates. Depending on plate alloy and thickness and the degree of tongue penetration desired, some welding parameters, such as rate of torch travel and welding current, may have to be slightly adjusted. However, any such variations are minimal and are contemplated to fall within the scope of the present invention.

The method of the present invention thus provides an improved gas metal arc welding method which, because of significant reductions in welding time, is more economical than prior welding methods and is additionally advantageous in that a high quality welded joint is produced.

In order to more completely understand the present invention, the following example is presented.

EXAMPLE

The method of the present invention was used for welding 6063 aluminum alloy extrusions having a thickness of 0.625 inch (15.8 mm). The weld joint was 7 inches (1.7 cm) in length and was welded in two passes (one pass per side of the plate) with a total welding time of 0.7 minute. 24.8 liters of argon were consumed and 0.039 kilogram of metal was deposited. A 1.59 millimeter electrode diameter was used on each pass. A voltage potential of 28.0 volts, an amperage ranging from 330 to 360 amps direct current, and an argon gas flow rate of 75 cubic feet per hour were used. The torch travel rate was 20 inches per minute (50.8 cm per minute) with a wire feed rate or usage rate of 416 inches per minute (105.6 cm per minute). The method of the present invention was economical and produced a joint having good mechanical properties and minimal porosity.

For comparative purposes, plates of the same alloy and size are welded using a conventional gas metal arc process and using an electrode diameter of 1.59 millimeters. A conventional 30° double bevel shaped joint design is employed. The plates are satisfactorily welded in 8 passes (4 passes per side). 99 liters of 65% helium-35% argon gas are consumed and 0.11 kilogram of metal is deposited; gas flow rate is 60 cubic feet per hour. Using the conventional process, the plates are welded with a voltage potential of 27.0 volts and an amperage of 240 amps direct current. The torch travel rate is 16 inches per minute with a wire feed rate of 225 inches per minute.

While the invention has been described in terms of preferred embodiments, the claims appended hereto are intended to encompass all embodiments which fall within the spirit of the invention.

What is claimed is:

1. A method of gas metal arc welding aluminum or aluminum alloy plates comprising the steps of:
   (a) providing a first and second aluminum plate having abutting edges which form a weld line, the abutting edge of the second plate including a tongue portion having (1) a land surface abutting a portion of the edge of said first plate, and (2) two arcuate J-shaped side surfaces, each adjoining the land surface at opposite ends thereof and each adjoining its respective side surface of the second plate at an angle approximating 90°, the J-shaped side surfaces of the tongue portion and surface of the first plate cooperating to define a modified double-J welding groove, thereby providing a first weld groove on one side of the plates and a second weld groove on the other side of the plates;
   (b) welding the plates together by depositing a first weld bead in the first weld groove to completely fill said groove in a single pass;
   (c) after said first weld bead has sufficiently solidified, depositing a second weld bead in a single pass in the second weld groove, said second weld bead completely filling said second groove and extending into said first bead to completely penetrate that portion of the weld line not penetrated by said first weld bead said welding of steps (b) and (c) being carried out by impressing a direct current of 290 to 420 amperes between an electrode of a welding torch and said plates with the electric arc formed thereby shielded primarily by argon gas, the torch maintaining a positive lead angle relative to the plate surface.

2. The method as set forth in claim 1 wherein the abutting edge of the first plate and the land surface of the second plate are substantially planar.

3. The method as set forth in claim 1 wherein the abutting edge of the first plate and the land surface of the second plate are substantially normal with respect to their respective plate side surfaces.

4. The method as set forth in claim 1 wherein the double-J groove adjoins the respective side surfaces of the second plate at an angle between 85 and 95°.

5. The method as set forth in claim 1 wherein the arcuate J-shaped side surfaces adjoin the land surface at approximately a right angle.

6. The method as set forth in claim 1 wherein the grooves of the modified double-J groove have a depth to groove opening ratio of 1.33 to 1.

7. The method as set forth in claim 1 wherein the tongue portion is penetrated by the first weld bead to a depth approximating between 60 and 70% of the tongue width.

8. The method as set forth in claim 1 wherein a ratio approximating 2 to 1 exists between the tongue height and the J-shaped side surface's radius of curvature.

9. The method as set forth in claim 1 wherein the torch travels along the welding groove at a rate ranging from 5 to 24 inches per minute.

10. The method as set forth in claim 1 wherein the torch travels along the welding groove at a rate ranging from 8 to 24 inches per minute when said welding is in the horizontal position.

11. The method as set forth in claim 1 wherein the torch travels along the welding groove at a rate ranging from 5 to 8 inches per minute when said welding is in the vertical position.

12. The method as set forth in claim 1 wherein the torch travels along the welding groove at a rate ranging from 6 to 12 inches per minute when said welding is in the flat position.

13. The method as set forth in claim 1 wherein the torch travels along the welding groove at a rate ranging from 8 to 24 inches per minute when said welding is in the overhead position.

14. The method as set forth in claim 1 wherein the welding torch maintains a positive lead angle of between 5 and 15° during the welding steps.

15. The method as set forth in claim 1 wherein the welding torch maintains a torch angle of between 5 and 15° during the welding steps.

16. The method as set forth in claim 1 wherein the electrode diameter is greater than or equal to 1/16 inch.

17. The method as set forth in claim 1 wherein plate thickness ranges from ⅜ to 1½ inches.

18. The method as set forth in claim 1 wherein argon gas consumption is between 50 and 100 cubic feet per hour.

19. A method of gas metal arc welding aluminum or aluminum alloy plates comprising the steps of:
(a) providing a first and second aluminum plate having abutting edges which form a weld line, said plates having a thickness of between ⅜ and 1½ inches, the abutting edge of said first plate being substantially planar and normal with respect to the plate's side surfaces, the abutting edge of the second plate including a tongue portion having (1) a planar land surface abutting a portion of the planar edge of said first plate, and (2) two arcuate J-shaped side surfaces, each of which adjoins the land surface at opposite ends thereof at about 90° angles and each of which adjoins its respective side surface of the second plate at an angle approximating 90°, the J-shaped side surfaces of the tongue portion and planar surface of the first plate cooperating to define a modified double-J welding groove, thereby providing a first weld groove on one side of the plates and a second weld groove on the other side of the plates;
(b) welding the plates together by depositing a first weld bead in a first weld groove to completely fill said groove in a single pass;
(c) after said first weld bead has sufficiently solidified, depositing a second weld bead in a single pass in the second weld groove, said second weld bead completely filling said second groove and extending into said first bead to completely penetrate that portion of the weld line not penetrated by said first weld bead said welding of steps (b) and (c) being carried out by impressing a direct current of 290 to 420 amperes between an electrode of a welding torch and said plates with the electric arc formed thereby shielded primarily by argon gas, the torch maintaining a 5° to 15° positive lead angle.

20. A welded joint made by gas metal arc welding for joining aluminum or aluminum alloy plates comprising:
(a) a joining line formed between abutting edges of the first and second welded plates;
(b) a first weld bead extending along said joining line on one surface of the joined aluminum plates deposited in a single welding pass to completely fill a first weld groove;
(c) a second weld bead extending along said joining line on the opposite surface of the joined plates and deposited in a single welding pass to completely fill a second weld groove, said second weld bead having penetrated that portion of the joining line not penetrated by the first weld bead;
(d) said first and second weld beads forming a modified double-J shaped welded joint, which prior to weld bead deposition included a double-J groove having the first groove on one side of the plates and the second groove on the opposite side of the plates, said grooves being defined by the abutting edge of the first plate and a tongue portion of the second plate having a land surface abutting the edge of the first plate and two arcuate J-shaped side surfaces, each adjoining the land surface at opposite ends thereof and each adjoining its respective side surface of the second plate at an angle approximating 90°; and
(e) said weld beads deposited in said grooves by a welding torch maintained at a positive lead angle relative to the plate surface.

21. A welded joint as recited in claim 20 wherein prior to weld bead deposition the abutting edge of the first plate and the land surface of the second plate are substantially planar.

22. A welded joint as recited in claim 20 wherein prior to weld bead deposition the abutting edge of the first plate and the land surface of the second plate are substantially normal with respect to their plate surfaces.

23. A welded joint as recited in claim 20 wherein prior to weld bead deposition the arcuate J-shaped side surfaces adjoin the land surface at an angle approximating 90°.

24. A welded joint as recited in claim 20 wherein prior to weld bead deposition the grooves of the modified double-J groove have a depth to groove opening ratio of 1.33 to 1.

25. A welded joint as recited in claim 20 wherein prior to weld bead deposition a ratio approximating 2 to 1 exists between the tongue height and the J-shaped side surface's radius of curvature.

* * * * *